United States Patent
Cady et al.

(10) Patent No.: US 9,803,437 B2
(45) Date of Patent: Oct. 31, 2017

(54) SHAKER SCREEN ASSEMBLY

(71) Applicant: M-I L.L.C., Houston, TX (US)

(72) Inventors: Eric Cady, Florence, KY (US); Brian S. Carr, Boone, KY (US)

(73) Assignee: M-I L.L.C., Houston, TX (US)

(*) Notice: Subject to any disclaimer, the term of this patent is extended or adjusted under 35 U.S.C. 154(b) by 233 days.

(21) Appl. No.: 14/407,299

(22) PCT Filed: Jun. 11, 2013

(86) PCT No.: PCT/US2013/045053
§ 371 (c)(1),
(2) Date: Dec. 11, 2014

(87) PCT Pub. No.: WO2013/188322
PCT Pub. Date: Dec. 19, 2013

(65) Prior Publication Data
US 2015/0122500 A1    May 7, 2015

Related U.S. Application Data

(60) Provisional application No. 61/658,158, filed on Jun. 11, 2012.

(51) Int. Cl.
*E21B 21/06* (2006.01)
*B07B 1/46* (2006.01)
(Continued)

(52) U.S. Cl.
CPC .......... *E21B 21/01* (2013.01); *B01D 33/0061* (2013.01); *B01D 33/54* (2013.01);
(Continued)

(58) Field of Classification Search
CPC ....... E21B 21/065; B07B 1/46; B07B 1/4609; B07B 1/4618; B07B 1/4645
See application file for complete search history.

(56) References Cited

U.S. PATENT DOCUMENTS 6,269,953 B1 * 8/2001 Seyffert ............... B01D 29/012
                                                   209/399
6,601,709 B2    8/2003 Schulte et al.
(Continued)

FOREIGN PATENT DOCUMENTS

GB          729938 A  *  5/1955  ............ B07B 1/469
WO    2011135320 A1    11/2011

OTHER PUBLICATIONS

International Search Report and Written Opinion issued in PCT/US2013/045053 dated Nov. 18, 2013, 15 pages.
(Continued)

*Primary Examiner* — George Gray
(74) *Attorney, Agent, or Firm* — David J. Smith

(57) ABSTRACT

A scalping insert includes a scalping surface having a plurality of scalping slots therethrough, and a vertical base portion. A shaker screen assembly includes a screen frame having at least one slot, and at least one scalping insert disposed in the at least one slot of the screen frame. A method of processing fluid includes providing a flow of fluid to a shaker screen assembly; and flowing the fluid through a scalping surface and a screen surface of a single shaker screen deck.

19 Claims, 6 Drawing Sheets

(51) Int. Cl.
- *E21B 21/01* (2006.01)
- *B01D 33/00* (2006.01)
- *B01D 33/54* (2006.01)
- *B01D 37/00* (2006.01)
- *E21B 21/00* (2006.01)

(52) U.S. Cl.
CPC ............ *B01D 37/00* (2013.01); *B07B 1/4645* (2013.01); *E21B 2021/007* (2013.01)

(56) References Cited

U.S. PATENT DOCUMENTS

| | | |
|---|---|---|
| 2004/0099578 A1 | 5/2004 | Winkler et al. |
| 2007/0131592 A1 | 6/2007 | Browne et al. |
| 2008/0135463 A1 | 6/2008 | Scott et al. |
| 2010/0270216 A1 | 10/2010 | Burnett et al. |
| 2012/0103890 A1* | 5/2012 | Larsson ................. B01D 33/23 210/236 |

OTHER PUBLICATIONS

Office Action for the equivalent Canadian patent application 2876316 dated Jan. 14, 2016.

Examination Report for the equivalent UK patent application 1500158.9 dated Feb. 9, 2017.

\* cited by examiner

SHAKER SCREEN ASSEMBLY

BACKGROUND

Vibratory separators are used to separate solid particulates of different sizes and/or to separate solid particulate from fluids. Vibratory separators may be used in the oil and gas industry, in which they are often referred to as shale shakers. Shale shakers or vibratory separators are used to remove cuttings and other solid particulates from drilling mud returned from a wellbore. A shale shaker is a vibrating sieve-like table upon which returning used drilling mud is deposited and through which substantially cleaner drilling mud emerges. The shale shaker may be an angled table with a generally perforated filter screen bottom. Returning drilling mud is deposited at one end of the shale shaker. As the drilling mud travels toward the opposite end, the fluid falls through the perforations to a reservoir below, thereby leaving the solid particulate material behind. Vibratory separators may also be used in the food industry, cleaning industry, waste water treatment, and others.

Shale shakers may have one, two, or three screening decks. In many multi-deck shakers the top deck is a scalping deck designed to remove large heavy solids from the fluid stream before the stream reaches the finer mesh screens. Scalping generally increases screen life and fluid capacity of finer screens. Increasing screen life and fluid capacity may be a large costs savings for a rig. Single deck shakers are lower in cost than multiple deck shakers and are not alone capable of scalping. Although single deck shakers can be used in series to scalp the fluid stream in one shaker before fine screening is done in separate shakers, this requires much more floor space to accommodate multiple shakers. Expensive multiple deck shakers are most often used offshore where there is limited available rig floor space. Despite many valuable contributions from the art, it would be beneficial to develop a screen capable of performing the scalping and fine screening in one deck.

DETAILED DESCRIPTION

Figure 1:
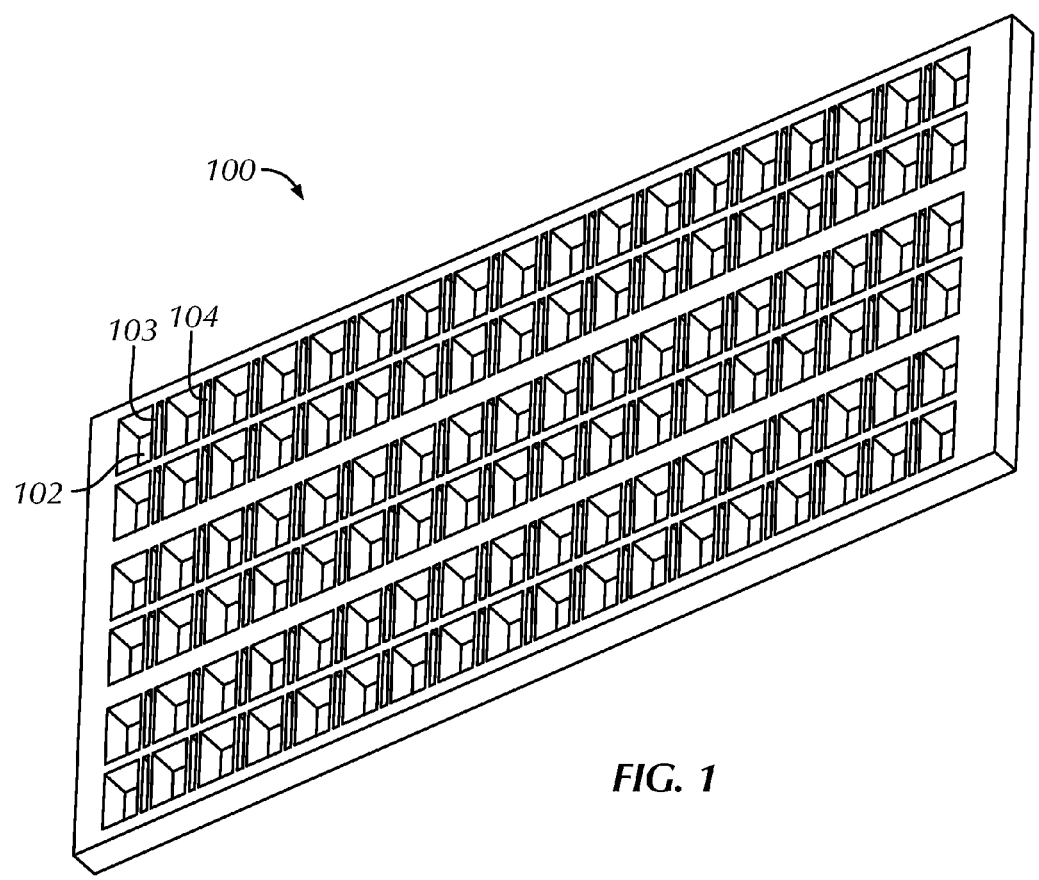
FIG. 1 shows a perspective view of a screen frame in accordance with one or more embodiments of the present disclosure.

The following is directed to various embodiments of the disclosure. Although one or more of these embodiments may be preferred, the embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment. This description is not intended to identify key or essential features of the claimed subject matter, nor is it intended to be used as an aid in limiting the scope of the claimed subject matter. Specifically, while embodiments disclosed herein may reference shale shakers or vibratory separators used to separate cuttings from drilling fluids in oil and gas applications, one of ordinary skill in the art will appreciate that a vibratory separator (or vibratory shaker) and its component parts as disclosed herein and methods disclosed herein may be used in any industrial application. For example, vibratory separators in accordance with embodiments disclosed herein may be used in the food industry, cleaning industry, waste water treatment, and others.

Embodiments disclosed herein relate generally to vibratory separators. In one aspect, embodiments disclosed herein relate to a shaker screen assembly including a screen frame having at least one slot; and at least one scalping insert disposed in the at least one slot of the screen frame.

In another aspect, embodiments disclosed herein relate to a scalping insert including a scalping surface having a plurality of scalping slots therethrough; and a vertical base portion.

In another aspect, embodiments disclosed herein relate to a method of processing fluid, the method including providing a flow of fluid to a shaker screen assembly and flowing the fluid through a scalping surface and a screen surface of a single shaker screen deck. In some embodiments, the fluid may be a drilling fluid, waste water fluid, or other fluids containing particulate matter therein.

Certain terms are used throughout the following description and claims refer to particular features or components. As those having ordinary skill in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first component is coupled to a second component, that connection may be through a direct connection, or through an indirect connection via other components, devices, and connections.

In one aspect, embodiments disclosed herein relate to vibratory shakers with two screening surfaces of a single screen frame or deck which are in series so that a majority of the fluid passing through the two screening surfaces of the screen frame is screened twice. The first screening surface of the shaker is a scalping deck. The scalping deck is positioned above the second screen surface, which is a finer screen deck surface of wire cloth. The scalping deck may include scalping inserts to filter out most of the large solids from a fluid stream prior to passing through the finer screen deck surface below. In one example, the vibratory separator may be an oilfield shale shaker.

Referring initially to FIG. 1, a composite screen frame 100 in accordance with one or more embodiments of the present disclosure is shown. The composite screen frame 100 is configured to be disposed in a shaker as will be understood by one of ordinary skill in the art. The screen frame 100 is formed having an array of individual openings or cells 102 separated by transverse ribs 103. Rib slots 104, into which scalping inserts will be inserted, are formed in ribs 103. In other embodiments, rib slots 104 may also be formed in ribs perpendicular to ribs 103 shown in the figures (not shown). For example, rib slots, into which scalping inserts are inserted, may be formed in any number of different manners in any number of ribs in the screening surface. Although screen frame 100 is described as a composite screen frame, one of ordinary skill in the art will appreciate that other types of screen frames may be used without departing from the scope of embodiments disclosed herein.

Figure 2A:
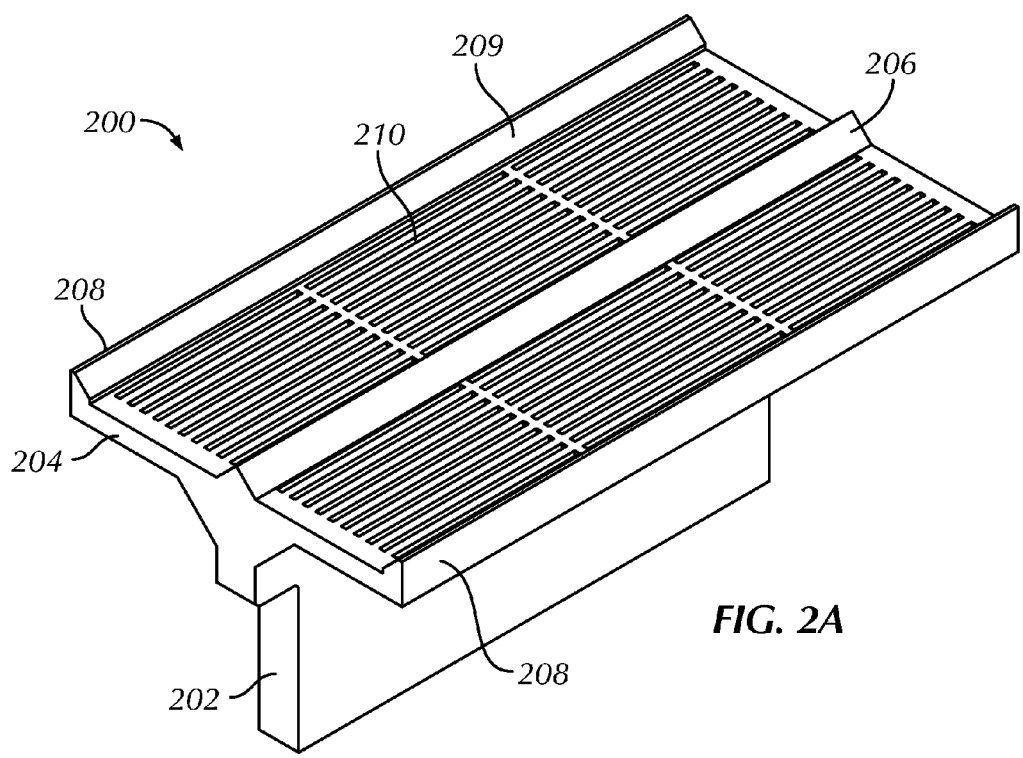
FIGS. 2A-2C show a scalping insert in accordance with one or more embodiments of the present disclosure.
Figure 2B:
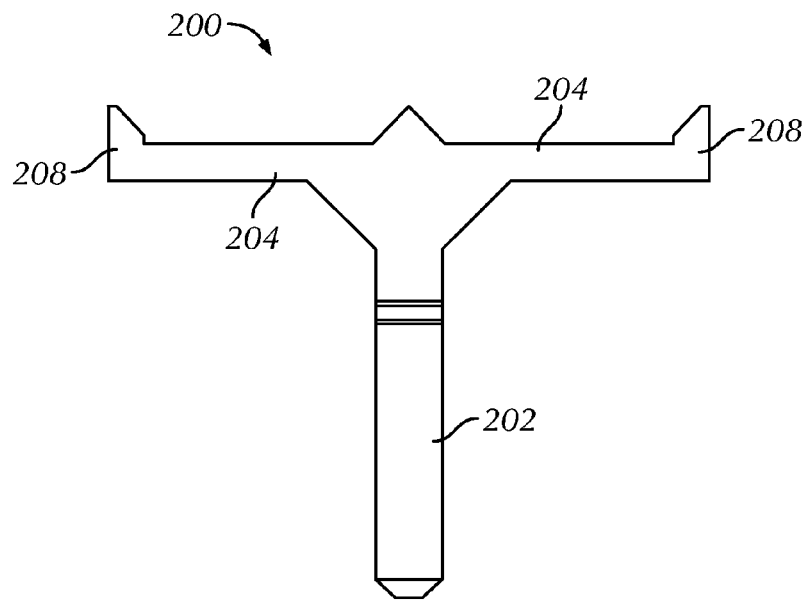
Figure 2C:
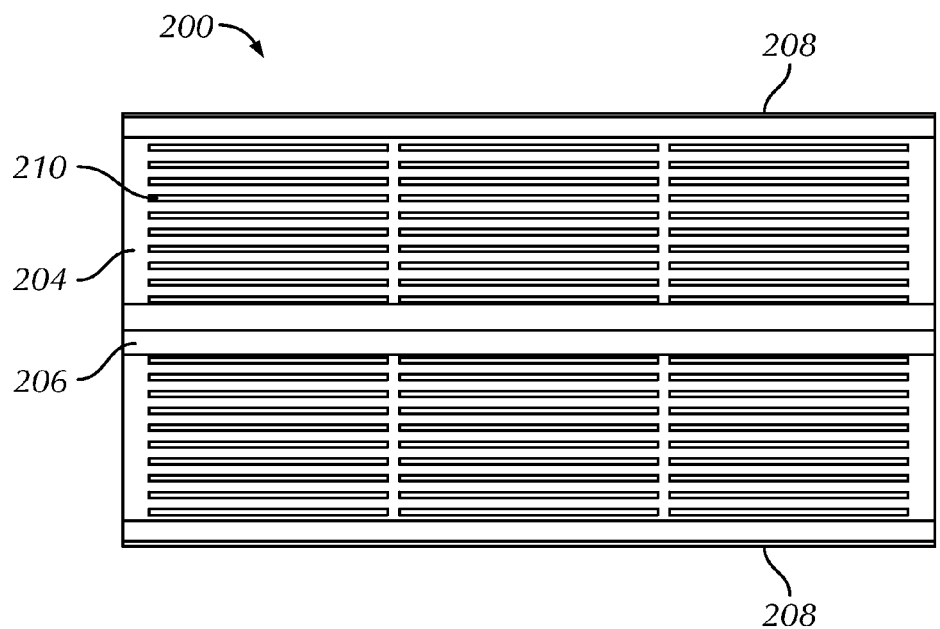

Referring now to FIGS. 2A-2C, a scalping insert 200 for use with a shaker screen in accordance with one or more embodiments of the present disclosure is shown. The scalping insert 200 includes a scalping surface 204 which is substantially horizontal and which has multiple scalping slots 210 through the surface. While the scalping slots 210 are shown in the figures as running lengthwise along the scalping surface 204, it will be understood that the scalping slots 210 may also run widthwise along the scalping surface 204 (i.e., perpendicular to that shown), or diagonally across the scalping surface 204, or any other direction, in accordance with one or more other embodiments.

The scalping surface 204 has raised sidewalls 208 on each end to encourage fluid to pass through scalping slots 210 of the scalping surface 204. Heights of the sidewalls 208 may be varied as required depending on fluid flow through the scalping surface 204. For example, scalping inserts with higher sidewalls 208 may be used when higher fluid flow rates pass through the scalping surface 204. Angled inner surfaces 209, extending from the top of the sidewalls 208 down toward the scalping surface 204, of the sidewalls 208 are configured to direct fluid toward the scalping slots 210. In addition, the scalping surface 204 includes a center divider 206 for similar purposes (i.e., to encourage fluid to flow through scalping slots 210). Likewise, angled surfaces of the center divider 206 also direct fluid toward the scalping slots 210. Scalping inserts may include a center divider 206 of varying heights (e.g., a scalping insert with a higher center divider 206 may be used for higher fluid flow rates).

The scalping insert 200 further includes a vertical base portion 202 which is configured to correspond with and be inserted into slots 104 (FIG. 1) of the screen frame 100. In certain embodiments, the base portion 202 may have a rectangular cross-section. In other embodiments, the base portion 202 may have other cross-sectional geometries that correspond with geometries of the slots 104 in the screen frame 100, such as, but not limited to polygonal, triangular, circular, and other known shapes. In further embodiments, the scalping inserts 200 may be configured having a dovetail shaped base portion that corresponds with a dovetail shaped slot in the screen surface, which would allow for horizontal installation of the scalping insert in the screen surface (rather than vertical installation shown in the figures). For example, the dovetail configuration of the scalping inserts 200 may correspond with a dovetail slot formed in the screen frame and into which the scalping inserts 200 may be installed.

The scalping inserts 200 may be made of any material suitable for oilfield screens. For example, glass-filled polypropylene or glass-filled nylon may be used in certain embodiments. In other embodiments, the scalping inserts 200 may be injection molded from material that is similar to the material used for composite screen frames, such as but not limited to, high-strength plastic and glass, reinforced with high-tensile-strength steel rods. In still other embodiments, the scalping inserts 200 may be cast from metal, urethane, or other materials. In addition, steel reinforcements may be used inside the molded scalping inserts to add rigidity to their structure.

The scalping surface 204 and vertical base portion 202 are at approximately a 90 degree angle to each other, and form a cross-section that resembles a T-shape. Other possible scalping insert 200 cross-section geometries formed by the scalping surface 204 and the base portion 202 include, but are not limited to, Y-shapes, U-shapes, and W-shapes. For example, the scalping insert geometries 200 may be dictated by the type of fluid being screened. For fluids with a higher content of gumbo or that are sticky, a flat or T-shape scalping insert 200 may be employed. In fluids with higher sand or other finer particle contents, a Y-shape scalping insert 200 may be used. Those skilled in the art will appreciate the various scalping insert cross-section geometries that most effectively screen various fluid contents.

The scalping slots 210 in the scalping surface 204 of scalping inserts 200 may have various cross-section geometries. For example, in certain embodiments, the scalping slots 210 may have a "wedge-wire" shape, which may be defined as a generally trapezoidal cross-section having a narrower opening at a top surface of the scalping surface 204 and progressively widening toward a bottom surface. The angled walls of the slot 210 may be between 5 and 20 degrees. In other embodiments, the scalping slots 210 may have trapezoidal cross-section having a wider opening at the top surface of the scalping surface 204 and progressively narrowing toward a bottom surface. In still further embodiments, the scalping slots 210 may have rectangular cross-sections. Certain scalping surfaces 204 may have scalping slots 210 with uniform cross-sectional geometries, while other scalping surfaces 204 may have scalping slots 210 with different cross-sectional geometries, for example, wedge-wire shaped scalping slots 210 on one side of a central divider 206, and rectangular scalping slots 210 on another side of the central divider 206. In still further embodiments, the scalping surface 204 may have alternating slot 210 cross-section geometries along a width thereof. Those skilled in the art will appreciate any number of slot 210 cross-sectional geometry configurations may be used.

The scalping insert 200 may be configured as individual screen inserts which are configured to be inserted individually into slots 104 of the screen frame 100. In certain embodiments, individual scalping inserts 200 may be fastened or coupled together to form a larger modular unit which includes multiple individual scalping inserts 200. For example, four individual scalping inserts 200 may be fastened together. In other embodiments, ten or more scalping inserts 200 may be combined to form a large modular unit of scalping inserts 200. In still further embodiments, a single modular scalping unit, which includes multiple individual scalping inserts 200 coupled together, may be formed and installed onto the screen frame as a single unit. Additionally, a single scalping unit configured to cover the entire screen frame surface may be used.

Figure 3A:
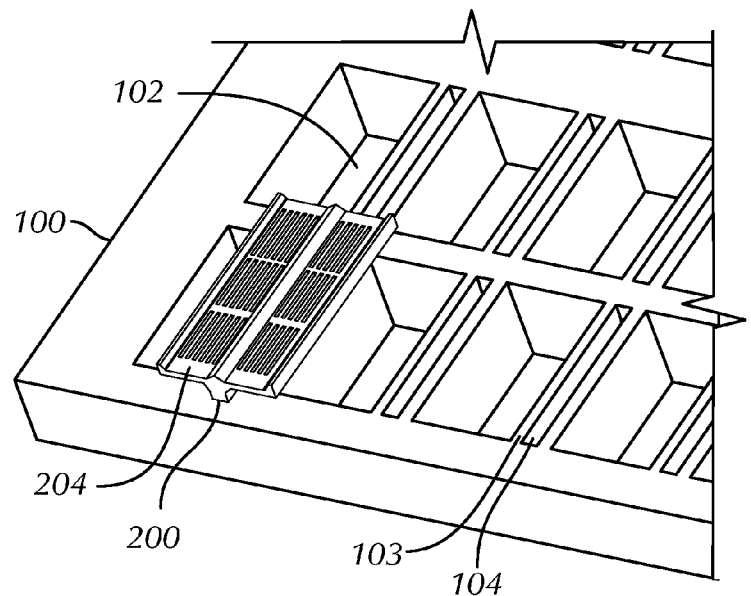
FIGS. 3A-3D show perspective views of scalping inserts installed in a screen frame in accordance with one or more embodiments of the present disclosure.

Referring now to FIGS. 3A-3D, various stages of scalping inserts 200 installed in the screen frame 100 in accordance with one or more embodiments are shown. As shown in FIG. 3A, a base portion 202 (FIG. 2A) is inserted into slots 104 of the screen frame 100, such that the scalping surface 204 is set at a specified distance above a surface of the screen frame 100. The scalping surface 204 may be spaced between 1 and 2 inches above a surface of the screen frame 100 in some embodiments. In other embodiments, the scalping surface 204 may be 2 inches or higher from a surface of the screen frame 100. In still further embodiments, various scalping inserts 200 may be positioned at various heights across the screen surface. For example, some scalping inserts 200 may be positioned at a first height above the screen surface while other scalping inserts 200 are positioned at a second height. Moreover, still other scalping inserts 200 may be positioned at a third height, and so on. It should be appreciated that in accordance with one or more embodiments disclosed herein, scalping inserts 200 may be positioned at any number and variations of heights above the screen frame surface.

Figure 3B:
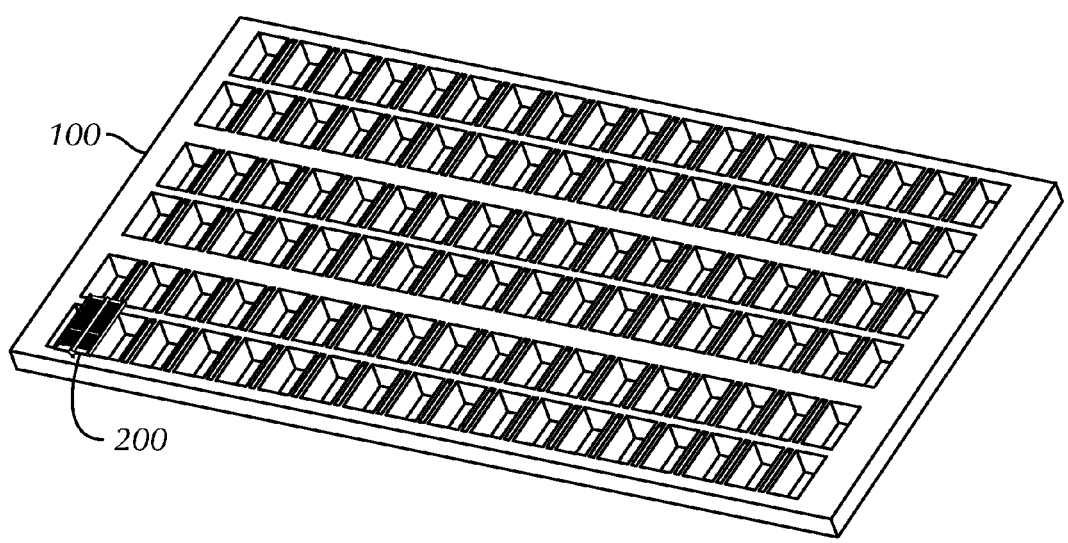
Figure 3C:
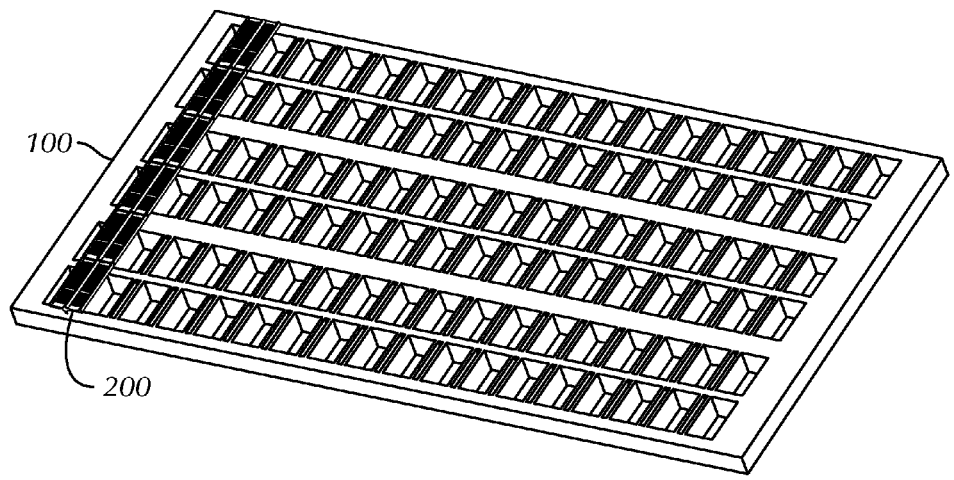
Figure 3D:
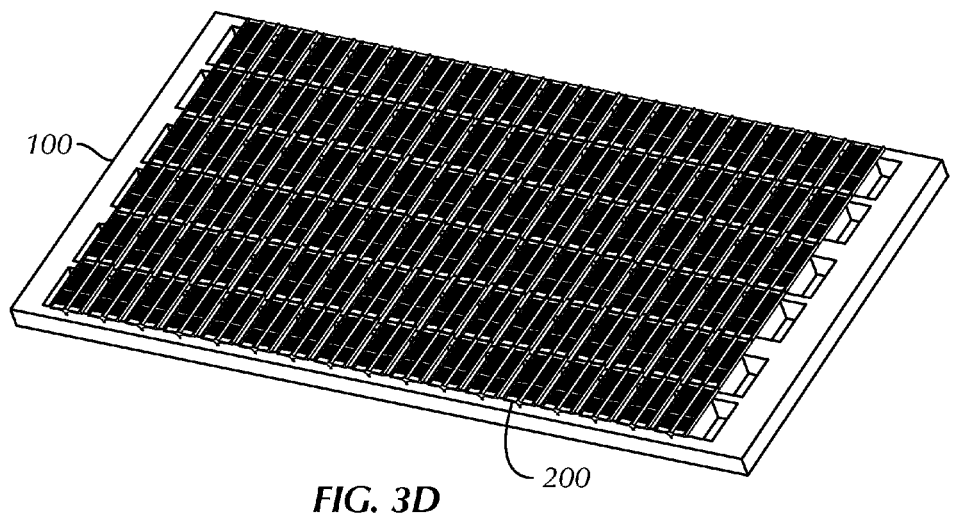

The scalping insert 200 may be secured in the slots 104 in various ways. For example, the base portion 202 of the scalping insert 200 may be removably secured in the slots 104 with mechanical fasteners, adhesives, snap-locks, or other known attachment techniques. In other examples, the base portion 202 of the scalping inserts 200 may be permanently secured in the slots 104 with welds, thermal bonding, or other known permanent attachment methods. Still further, the scalping units 200 may be inserted into the slots 104 without any type of fasteners, which allows the scalping units 200 to be quickly interchangeable. As shown in FIGS. 3B-3D, additional scalping inserts 200 may be installed in slots 104 of the screen frame 100 until an entire surface of the screen frame 100 is covered with scalping inserts 200.

Figure 4A:
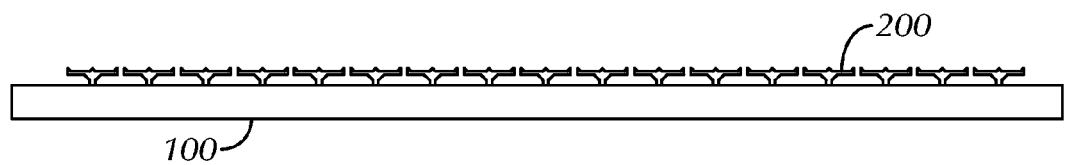
FIGS. 4A and 4B show cross-section views of scalping inserts installed in a screen frame in accordance with one or more embodiments of the present disclosure.
Figure 4B:
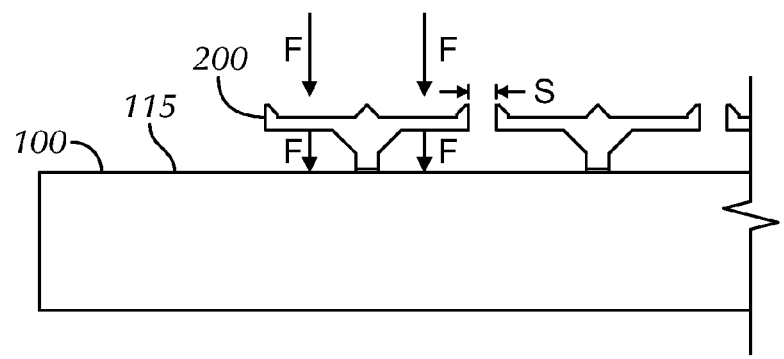

Methods of using the screen with scalping inserts 200 installed are described in reference to FIGS. 4A and 4B. A fine mesh screen 115 (FIG. 4B) may first be attached to a top surface of the screen frame 100 with adhesives or other known attachment techniques. The mesh screen 115 may have various size meshes to allow different particle sizes to pass through. After the mesh screen 115 is applied to the screen frame surface, the scalping inserts 200 are inserted into slots 104 of the screen frame 100 (the mesh screen 115 is cut away to allow insertion of the scalping inserts into the slots 104) and secured therein. Once the entire surface of the screen frame 100 has scalping inserts 200 installed, the screen may be put into use.

Screen frames with scalping inserts as described in embodiments herein are used to provide a series screen method of separating particles from fluid passing through the screen. Solids and fluids fall onto the screen surface, which is primarily covered with scalping inserts 200. In certain embodiments, there may be slight spacing 'S' between scalping inserts 200 through which solids may pass. The spacing is provided for visual inspection of the wire mesh 115 on the screen frame. In other embodiments however, there may be no spacing between scalping inserts 200, where instead the scalping inserts 200 abut each other over an entire screen surface.

As the fluid and solids fall onto the screen surface, most large solids stay on top of the scalping surfaces 204 (FIG. 2A) of the scalping inserts 200 as fluid 'F' passes through the scalping inserts 200. Fluid F and smaller solids pass through the scalping surfaces 204 of the scalping inserts 200 and fall to the finer screen mesh 115 below attached to the screen frame surface. As the fluid passes through the screen mesh, a finer screening of the fluid occurs in which the smaller solids are removed from the fluid.

In certain embodiments, scalping inserts 200 may be inserted into slots 104 to cover the entire screen frame 100. In alternate embodiments, scalping inserts 200 may be inserted into slots 104 in a portion of the screen frame 100. For example, scalping inserts 200 may be inserted in the screen frame (with wire mesh beneath) at a feed end of the screen frame 100 to handle larger and heavier solids while the remaining portion of the screen frame is covered with wire mesh.

Likewise, the mesh screen size (i.e., the mesh spacing) of the finer wire mesh used on the screen frame may be determined by characteristics of the particular wellbore. For example, depending on the wellbore characteristics, a coarse mesh screen may be used for drilling a wellbore containing, for example, mostly gumbo and a fine mesh screen may be used for drilling a wellbore containing, for example higher sand content. In other embodiments, different mesh sizes (i.e., mesh screen having different size openings) may be used on different surfaces of the same screen. For example, a first mesh screen size may be used to cover an area of the screening surface nearest an inlet of the screen and a second mesh screen size may be used to cover an area of the screening surface nearest an outlet of the screen.

In certain embodiments, the mesh screen may be fastened to cover the entire screening surface, i.e., all scalping inserts and the screen deck may be covered with mesh screen. The mesh screen size (i.e., the mesh spacing) may be determined by characteristics of the particular wellbore. For example, depending on the wellbore characteristics, a coarse mesh screen may be used for drilling a wellbore containing, for example, mostly gumbo and a fine mesh screen may be used for drilling a wellbore containing, for example higher sand content. In other embodiments, different mesh sizes (i.e., mesh screen having different size openings) may be used on different surfaces of the same screen. For example, a first mesh screen size may be used to cover the scalping inserts and a second mesh screen size may be used to cover the screen deck below the scalping inserts. In other embodiments, a first mesh screen size may be used to cover an area of the screening surface nearest an inlet of the screen and a second mesh screen size may be used to cover an area of the screening surface nearest an outlet of the screen.

Still further, in certain embodiments, sealing mechanisms (not shown) may be installed between adjacent scalping inserts 200 to avoid leak paths between the scalping inserts. For example, seals may first be installed in the slots 104 of the screen frame 100 prior to inserting the scalping inserts 200. Thus, when the scalping inserts 200 are installed, the seals in the slots 104 may engage the scalping inserts 200. In other embodiments, the scalping inserts 200 may have a seal disposed around an outer periphery (e.g., the base portion 202 shown in FIG. 2A) which engages a wall of the slots 104 when the scalping inserts 200 are installed in the slots 104 of the screen frame 100. Other sealing mechanisms for avoiding leak paths between the scalping inserts and the screen frame will be known to those having ordinary skill in the art.

Advantageously, embodiments of the present disclosure provide a shaker screen that may provide increased screen life, fluid capacity, and lower shaker cost. When large solids and clay-like material are removed from the fluid stream before it is introduced to the finer wire cloth, there is less material to bind or clog up the wire cloth which means more fluid may be processed. In addition, by scalping the large and heavy solids the fine mesh is protected and experiences lighter solids loading which increases the life the screen. Still further, the screen frame with scalping inserts is capable of scalping and fine screening a drilling fluid in a single pass through a vibratory separator. This reduces the amount of rig floor room needed to perform both scalping and screening operations, which may be done separately. Particularly, on offshore rigs where space is at a premium, the ability to both scalp and fine screen a drilling fluid in a single pass may be beneficial.

Although a few example embodiments have been described in detail above, those skilled in the art will readily appreciate that many modifications are possible in the example embodiments without materially departing from the scope of the present application. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. An apparatus comprising:
a screen frame having a screening surface provide by an array of openings separated by transverse ribs; and
at least one first scalping insert connected to the screen frame, the at least one scalping insert comprising:
a scalping surface having a plurality of scalping slots formed therethrough;
a vertical base portion contacting the screening surface of the screen frame such that the vertical base portion connects the at least one first scalping insert to the screen frame; and
a scalping surface support member disposed between the scalping surface and the vertical base portion of the at least one first scalping insert such that the scalping surface support member spaces the scalping surface of the at least one first scalping insert a vertical height above the screening surface of the screen frame.

2. The apparatus of claim 1 wherein the at least one first scalping insert further comprises sidewalls on each end of the scalping surface.

3. The apparatus of claim 2, wherein the sidewalls further comprise angled inner surfaces to direct fluid to the plurality of scalping slots in the scalping surface.

4. The apparatus of claim 1, wherein the at least one first scalping insert further comprises a center divider having an angled surface directed to the plurality of scalping slots in the scalping surface.

5. The apparatus of claim 1, wherein the plurality of scalping slots have a trapezoidal or rectangular cross-section geometry, the cross-section being taken perpendicularly to the longitudinal axis of the scalping slots.

6. The apparatus of claim 1, wherein the vertical base portion is configured to correspond with and be inserted into the first rib slot.

7. The apparatus of claim 1, further comprising at least one second scalping insert disposed in a second rib slot of the screen frame, the second scalping insert coupled to the at least one first scalping insert to form a modular scalping unit.

8. A shaker screen assembly comprising:
a screen frame having an array of openings separated by transverse ribs and at least one rib slot; and
at least one scalping insert, having a scalping surface with at least one scalping slot formed therethrough, disposed in the at least one rib slot of the screen frame, wherein a scalping surface support member spaces the scalping surface of the at least one scalping insert a vertical height above the screen frame.

9. The shaker screen assembly of claim 8, wherein the scalping surface of the at least one scalping insert is positioned above the screen frame by between about 1 and 2 inches.

10. The shaker screen assembly of claim 8, further comprising at least one seal disposed between the at least one scalping insert and the screen frame.

11. The shaker screen assembly of claim 8, further comprising a screen mesh on a surface of the screen frame.

12. The shaker screen assembly of claim 8, further comprising a screen mesh on a surface of the screen frame, wherein the screen mesh comprises at least two different mesh sizes.

13. The shaker screen assembly of claim 8, wherein the at least one scalping insert comprises a vertical base portion to be inserted into the at least one rib slot.

14. The shaker screen assembly of claim 8 wherein the at least one scalping insert is secured in the at least one rib slot of the screen frame with mechanical fasteners or adhesives.

15. The shaker screen assembly of claim 8, further comprising at least one second scalping insert disposed in at least a second rib slot of the screen frame, wherein spacing is provided between the at least one scalping insert and the at least one second scalping insert.

16. A method of processing fluid, the method comprising:
providing a flow of fluid to a shaker screen assembly having a scalping surface, that includes at least one scalping insert, and a screening surface, wherein a vertical base portion of the at least one scalping insert contacts the screening surface for connecting the scalping surface to the screening surface, wherein a scalping surface support member is disposed between the scalping surface and the vertical base portion such that the scalping surface is positioned at a vertical height above the screening surface; and
screening the fluid twice by flowing the fluid through the scalping surface and the screening surface.

17. The method of claim 16, wherein the screening the fluid twice comprises scalping and fine mesh screening the fluid in a single pass through the shaker screen assembly to provide a scalped fluid.

18. The method of claim 16 wherein the scalping surface comprises a plurality of scalping inserts coupled together or integrally formed.

19. The method of claim 16 further comprising flowing a portion of the fluid through the scalping surface prior to the screen surface.

* * * * *